United States Patent
Strilich et al.

(10) Patent No.: US 9,720,404 B2
(45) Date of Patent: Aug. 1, 2017

(54) GATEWAY OFFERING LOGICAL MODEL MAPPED TO INDEPENDENT UNDERLYING NETWORKS

(71) Applicant: Honeywell International, Inc., Morristown, NJ (US)

(72) Inventors: James A. Strilich, Phoenix, AZ (US); Paul F. McLaughlin, Ambler, PA (US); W. Russell Massey, Levittown, PA (US); Jethro F. Steinman, Haverford, PA (US); Ananthapadmanabha Krishnamurthy, Bangalore (IN)

(73) Assignee: Honeywell International Inc., Morris Plains, NJ (US)

(*) Notice: Subject to any disclaimer, the term of this patent is extended or adjusted under 35 U.S.C. 154(b) by 646 days.

(21) Appl. No.: 14/269,903

(22) Filed: May 5, 2014

(65) Prior Publication Data

US 2015/0316923 A1    Nov. 5, 2015

(51) Int. Cl.
*G06F 19/00* (2011.01)
*G05B 19/418* (2006.01)
(Continued)

(52) U.S. Cl.
CPC ... *G05B 19/4186* (2013.01); *G05B 19/41855* (2013.01); *H04L 67/12* (2013.01);
(Continued)

(58) Field of Classification Search
None
See application file for complete search history.

(56) References Cited

U.S. PATENT DOCUMENTS 4,679,189 A    7/1987  Olson et al.
5,537,414 A    7/1996  Takiyasu et al.
(Continued)

FOREIGN PATENT DOCUMENTS

DE    4134207 C1    4/1993
DE    103 14 721 A1    11/2004
(Continued)

OTHER PUBLICATIONS

International Search Report dated Jul. 21, 2015 in connection with International Application No. PCT/US2015/026058; 3 pages.
(Continued)

*Primary Examiner* — Wissam Rashid (57) ABSTRACT

An apparatus includes a first interface configured to communicate over a first industrial process control network using a first protocol. The apparatus also includes a second interface configured to communicate over a second industrial process control network using a second protocol. The apparatus further includes a third interface configured to communicate with at least one supervisory device over a third network. In addition, the apparatus includes at least one processing device configured to provide concurrent access for the at least one supervisory device to process control devices coupled to the first and second industrial process control networks during a migration of process control devices that use the first protocol to process control devices that use the second protocol.

20 Claims, 8 Drawing Sheets

(51) Int. Cl.
*H04L 29/08* (2006.01)
*H04L 29/06* (2006.01)

(52) U.S. Cl.
CPC .... *H04L 69/18* (2013.01); *G05B 2219/31115* (2013.01); *G05B 2219/31348* (2013.01); *G05B 2219/31369* (2013.01)

(56) References Cited

U.S. PATENT DOCUMENTS

| | | | |
|---|---|---|---|
| 5,566,356 A | 10/1996 | Taketsugu | |
| 5,664,195 A | 9/1997 | Chatterji | |
| 5,749,053 A | 5/1998 | Kusaki et al. | |
| 5,898,826 A | 4/1999 | Pierce et al. | |
| 6,141,769 A | 10/2000 | Petivan et al. | |
| 6,192,232 B1 | 2/2001 | Iseyama | |
| 6,256,297 B1 | 7/2001 | Haferbeck et al. | |
| 6,292,905 B1 | 9/2001 | Wallach et al. | |
| 6,374,352 B1 | 4/2002 | Goldman et al. | |
| 6,427,071 B1 | 7/2002 | Adams et al. | |
| 6,437,692 B1 | 8/2002 | Petite et al. | |
| 6,631,416 B2 | 10/2003 | Bendinelli et al. | |
| 6,694,447 B1 | 2/2004 | Leach et al. | |
| 6,701,453 B2 | 3/2004 | Chrabaszcz | |
| 6,751,219 B1 | 6/2004 | Lipp et al. | |
| 6,847,316 B1 | 1/2005 | Keller | |
| 6,850,486 B2 | 2/2005 | Saleh et al. | |
| 6,917,584 B2 | 7/2005 | Kuwabara | |
| 6,963,781 B2 | 11/2005 | Fehrer et al. | |
| 7,031,308 B2 | 4/2006 | Garcia-Luna-Aceves et al. | |
| 7,035,937 B2 | 4/2006 | Haas et al. | |
| 7,058,848 B2 | 6/2006 | Sicola et al. | |
| 7,130,701 B1 | 10/2006 | Wischinski | |
| 7,190,961 B2 | 3/2007 | Burr | |
| 7,203,743 B2 | 4/2007 | Shah-Heydari | |
| 7,236,987 B1 | 6/2007 | Faulkner et al. | |
| 7,240,188 B2 | 7/2007 | Takata et al. | |
| 7,275,157 B2 | 9/2007 | Cam Winget | |
| 7,366,114 B2 | 4/2008 | Park et al. | |
| 7,440,735 B2 | 10/2008 | Karschnia et al. | |
| 7,460,865 B2 | 12/2008 | Nixon et al. | |
| 7,620,409 B2 | 11/2009 | Budampati et al. | |
| 7,688,802 B2 | 3/2010 | Gonia et al. | |
| 7,802,016 B2 | 9/2010 | Eimers-Klose et al. | |
| 8,108,853 B2 | 1/2012 | Bale et al. | |
| 8,498,201 B2 | 7/2013 | Budampati et al. | |
| 8,756,412 B2 | 6/2014 | Pulini et al. | |
| 9,066,162 B2 | 6/2015 | Yang | |
| 2002/0072329 A1 | 6/2002 | Bandeira et al. | |
| 2002/0120671 A1 | 8/2002 | Daffner et al. | |
| 2002/0122230 A1 | 9/2002 | Izadpanah et al. | |
| 2002/0176396 A1 | 11/2002 | Hammel et al. | |
| 2003/0003912 A1 | 1/2003 | Melpignano et al. | |
| 2003/0005149 A1 | 1/2003 | Haas et al. | |
| 2003/0046397 A1 | 3/2003 | Trace et al. | |
| 2003/0177150 A1 | 9/2003 | Fung et al. | |
| 2003/0212768 A1 | 11/2003 | Sullivan | |
| 2004/0010694 A1 | 1/2004 | Collens et al. | |
| 2004/0028023 A1 | 2/2004 | Mandhyan et al. | |
| 2004/0029553 A1 | 2/2004 | Cain | |
| 2004/0083833 A1 | 5/2004 | Hitt et al. | |
| 2004/0174829 A1 | 9/2004 | Ayyagari | |
| 2004/0230899 A1 | 11/2004 | Pagnano et al. | |
| 2004/0259533 A1 | 12/2004 | Nixon et al. | |
| 2005/0059379 A1 | 3/2005 | Sovio et al. | |
| 2005/0071708 A1 | 3/2005 | Bartfai et al. | |
| 2005/0102562 A1 | 5/2005 | Shinohara et al. | |
| 2005/0141553 A1 | 6/2005 | Kim et al. | |
| 2005/0201349 A1 | 9/2005 | Budampati | |
| 2005/0228509 A1 | 10/2005 | James | |
| 2005/0254653 A1 | 11/2005 | Potashnik et al. | |
| 2005/0281215 A1 | 12/2005 | Budampati et al. | |
| 2005/0289553 A1 | 12/2005 | Miki | |
| 2006/0002368 A1 | 1/2006 | Budampati et al. | |
| 2006/0015641 A1 | 1/2006 | Ocko et al. | |
| 2006/0039347 A1 | 2/2006 | Nakamura et al. | |
| 2006/0083200 A1 | 4/2006 | Emeott et al. | |
| 2006/0104301 A1 | 5/2006 | Beyer et al. | |
| 2006/0128349 A1 | 6/2006 | Yoon | |
| 2006/0171344 A1 | 8/2006 | Subramanian et al. | |
| 2006/0171346 A1 | 8/2006 | Kolavennu et al. | |
| 2006/0227729 A1 | 10/2006 | Budampati et al. | |
| 2006/0256740 A1 | 11/2006 | Koski | |
| 2006/0271814 A1 | 11/2006 | Fung et al. | |
| 2006/0274644 A1 | 12/2006 | Budampati et al. | |
| 2006/0274671 A1 | 12/2006 | Budampati et al. | |
| 2006/0282498 A1 | 12/2006 | Muro | |
| 2006/0287001 A1 | 12/2006 | Budampati et al. | |
| 2007/0022317 A1 | 1/2007 | Chen et al. | |
| 2007/0030816 A1 | 2/2007 | Kolavennu | |
| 2007/0030832 A1 | 2/2007 | Gonia et al. | |
| 2007/0067458 A1 | 3/2007 | Chand | |
| 2007/0073861 A1 | 3/2007 | Amanuddin et al. | |
| 2007/0076638 A1 | 4/2007 | Kore et al. | |
| 2007/0077941 A1 | 4/2007 | Gonia et al. | |
| 2007/0087763 A1 | 4/2007 | Budampati et al. | |
| 2007/0091824 A1 | 4/2007 | Budampati et al. | |
| 2007/0091825 A1 | 4/2007 | Budampati et al. | |
| 2007/0103303 A1 | 5/2007 | Shoarinejad | |
| 2007/0147294 A1 | 6/2007 | Bose et al. | |
| 2007/0153677 A1 | 7/2007 | McLaughlin et al. | |
| 2007/0153789 A1 | 7/2007 | Barker, Jr. et al. | |
| 2007/0155423 A1 | 7/2007 | Carmody et al. | |
| 2007/0237137 A1 | 10/2007 | McLaughlin | |
| 2007/0261052 A1 | 11/2007 | Bale et al. | |
| 2007/0280178 A1 | 12/2007 | Hodson et al. | |
| 2008/0043637 A1 | 2/2008 | Rahman | |
| 2008/0140844 A1 | 6/2008 | Halpern | |
| 2008/0267259 A1 | 10/2008 | Budampati et al. | |
| 2008/0273547 A1 | 11/2008 | Phinney | |
| 2009/0022121 A1 | 1/2009 | Budampati et al. | |
| 2009/0034441 A1 | 2/2009 | Budampati et al. | |
| 2009/0060192 A1 | 3/2009 | Budampati et al. | |
| 2009/0086692 A1* | 4/2009 | Chen ............... H04L 63/105 370/338 |
| 2009/0109889 A1 | 4/2009 | Budampati et al. | |
| 2009/0138541 A1 | 5/2009 | Wing et al. | |
| 2010/0042869 A1 | 2/2010 | Szabo et al. | |
| 2010/0077254 A1 | 3/2010 | Erdmann et al. | |
| 2010/0128699 A1 | 5/2010 | Yang et al. | |
| 2010/0287548 A1 | 11/2010 | Zhou et al. | |
| 2011/0305206 A1 | 12/2011 | Junell et al. | |
| 2012/0101663 A1 | 4/2012 | Fervel et al. | |
| 2012/0117416 A1* | 5/2012 | McLaughlin ....... G06F 11/1658 714/4.11 |
| 2012/0127856 A1 | 5/2012 | Park et al. | |

FOREIGN PATENT DOCUMENTS

| | | |
|---|---|---|
| EP | 1 081 895 A1 | 3/2001 |
| EP | 1 401 171 A2 | 3/2004 |
| EP | 1 439 667 A2 | 7/2004 |
| EP | 2 466 800 A2 | 6/2012 |
| GB | 2 427 329 A | 12/2006 |
| WO | WO 01/35190 A2 | 5/2001 |
| WO | WO 03/079616 A1 | 9/2003 |
| WO | WO 2004/047385 A2 | 6/2004 |
| WO | WO 2004/114621 A1 | 12/2004 |
| WO | WO 2006/017994 A1 | 2/2006 |
| WO | WO 2006/053041 A1 | 5/2006 |
| WO | WO 2011/019144 A2 | 2/2011 |
| WO | WO 2013/157757 A1 | 10/2013 |

OTHER PUBLICATIONS

Written Opinion of the International Searching Authority in connection with International Application No. PCT/US2015/026058; 5 pages.

Salman Taherian, et al., "Event Dissemination in Mobile Wireless Sensor Networks", 2004 IEEE International Conference on Mobile Ad-Hoc and Sensor Systems, p. 573-575.

Dongyan Chen et al., "Dependability Enhancement for IEEE 802.11 Wireless LAN with Redundancy Techniques," Proceedings of the (56) References Cited

OTHER PUBLICATIONS

2003 International Conference on Dependable Systems and Networks, 2003, 8 pages.

Dr. Soumitri Kolavennu, Presentation, "WNSIA MAC Layer", ISA SP100 meeting, Feb. 14, 2007, 24 pages, see esp. p. 17.

Ying Zhang, et al., "A Learning-based Adaptive Routing Tree for Wireless Sensor Networks", Journal of Communications, vol. 1, No. 2, May 2006, p. 12-21.

Yau-Ming Sun, et al., "An Efficient Deadlock-Free Tree-Based Routing Algorithm for Irregular Wormhole-Routed Networks Based on the Turn Model", Proceedings of the 2004 International Conference on Parallel Processing (ICPP'04), 10 pages.

Sejun Song, "Fault Recovery Port-based Fast Spanning Tree Algorithm (FRP-FAST) for the Fault-Tolerant Ethernet on the Arbitrary Switched Network Topology", 2001 IEEE, p. 325-332.

"XYR 5000 Wireless Transmitters, Honeywell Solutions for Wireless Data Acquisiton and Monitoring," www.acs.honeywell.com, Feb. 2006, 6 pages.

Communication pursuant to Article 94(3) EPC dated Apr. 2, 2009 in connection with European Patent Application No. 07 761 784.3.

A. Aiello et al., "Wireless Distributed Measurement System by Using Mobile Devices," IEEE Workshop on Intelligent Data Acquisition and Advanced Computing Systems: Technology and Applications, Sep. 5-7, 2005, Sofia, Bulgaria, pp. 316-319.

International Search Report and Written Opinion of the International Searching Authority in PCT Application No. PCT/US2007/069717 dated Dec. 10, 2007.

International Search Report and Written Opinion of the International Searching Authority in PCT Application No. PCT/US2007/069614 dated Nov. 22, 2007.

International Search Report and Written Opinion of the International Searching Authority in PCT Application No. PCT/US2007/069710 dated Nov. 27, 2007.

International Search Report and Written Opinion of the International Searching Authority in PCT Application No. PCT/US2007/069705 dated Apr. 15, 2008.

Pereira, J.M. Dias, "A Fieldbus Prototype for Educational Purposes", IEEE Instrumentation & Measurement Magazine, New York, NY vol. 7, No. 1, Mar. 2004, p. 24-31.

International Search Report and Written Opinion of the International Searching Authority in PCT Application No. PCT/US2006/048334 dated Jul. 5, 2007.

European Search Report dated Oct. 6, 2008 in connection with European Patent Application No. 08 16 1387.

\* cited by examiner

GATEWAY OFFERING LOGICAL MODEL MAPPED TO INDEPENDENT UNDERLYING NETWORKS

TECHNICAL FIELD

This disclosure relates generally to industrial process control and automation systems. More specifically, this disclosure relates to a gateway offering a logical model mapped to independent underlying networks.

BACKGROUND

Industrial process control and automation systems are often used to automate large and complex industrial processes. These types of control and automation systems routinely include sensors, actuators, and controllers. The controllers typically receive measurements from the sensors and generate control signals for the actuators.

If an existing legacy controller in a control and automation system is approaching its "end of life," a new type of controller may need to be installed in the system. However, if the new type of controller is considerably different from the legacy controller being replaced, installing the new type of controller may require significant modifications to higher-level controllers, human-machine interfaces, or other components.

One prior approach to switching controllers involves performing a cutover of one or more legacy devices connected to an old network to replacement devices connected to a new network. This approach requires an industrial facility (or a portion thereof) to be shut down for a period of time. It may also require replacement of custom-created user interfaces and control applications used with the legacy devices. This can impose significant monetary losses on the facility's operators.

SUMMARY

This disclosure provides a gateway offering a logical model mapped to independent underlying networks.

In a first embodiment, an apparatus includes a first interface configured to communicate over a first industrial process control network using a first protocol. The apparatus also includes a second interface configured to communicate over a second industrial process control network using a second protocol. The apparatus further includes a third interface configured to communicate with at least one supervisory device over a third network. In addition, the apparatus includes at least one processing device configured to provide concurrent access for the at least one supervisory device to process control devices coupled to the first and second industrial process control networks during a migration of process control devices that use the first protocol to process control devices that use the second protocol.

In a second embodiment, a method includes communicating over a first industrial process control network using a first protocol via a first interface. The method also includes communicating over a second industrial process control network using a second protocol via a second interface. The method further includes communicating with at least one supervisory device over a third network via a third interface. In addition, the method includes providing concurrent access for the at least one supervisory device to process control devices coupled to the first and second industrial process control networks during a migration of process control devices that use the first protocol to process control devices that use the second protocol.

In a third embodiment, a non-transitory computer readable medium embodies a computer program. The computer program includes computer readable program code for initiating communication over a first industrial process control network using a first protocol via a first interface. The computer program also includes computer readable program code for initiating communication over a second industrial process control network using a second protocol via a second interface. The computer program further includes computer readable program code for initiating communication with at least one supervisory device over a third network via a third interface. In addition, the computer program includes computer readable program code for providing concurrent access for the at least one supervisory device to process control devices coupled to the first and second industrial process control networks during a migration of process control devices that use the first protocol to process control devices that use the second protocol.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 5 and 6 illustrate example graphical user interfaces supporting migration from legacy devices to new devices according to this disclosure.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In the following description, a gateway supporting migration from legacy devices to new devices is described. A "legacy" device refers to a device being replaced by a more recent, more advanced, or other device. A "legacy" protocol refers to a protocol used by a legacy device, a "legacy" interface refers to an interface that supports the use of a legacy protocol, and a "legacy" network refers to a network that supports the use of a legacy protocol. A "new" or "advanced" device refers to a device that is replacing a legacy device. An "advanced" protocol refers to a protocol used by a new or advanced device, an "advanced" interface refers to an interface that supports the use of an advanced protocol, and an "advanced" network refers to a network that supports the use of an advanced protocol. Note that the terms "migration" and "replacement" (and their derivatives), when used with reference to a legacy device, include both a physical replacement of the legacy device with a new or advanced device and an upgrade of the legacy device to have one or more features of a new or advanced device.

Although the gateway is often described below as supporting the replacement of legacy process controllers with new or advanced process controllers in a process control and automation system, the gateway is not limited to use with just process controllers. Rather, the gateway can be used with any number(s) and type(s) of legacy devices being replaced with any number(s) and type(s) of new or advanced devices. Also, as a specific example of this functionality, the gateway is often described below as supporting the replacement of HIWAY-compliant devices with EXPERION-compliant devices, as well as the optional use of an emulated HIWAY protocol over a FAULT TOLERANT ETHERNET (FTE) network (HIWAY, EXPERION, and FAULT TOLERANT ETHERNET were developed by HONEYWELL INTERNATIONAL INC. or its subsidiaries). These specific protocols are examples only. The gateway disclosed in this patent document generally supports the replacement of any suitable legacy devices with any suitable new or advanced devices. Moreover, the gateway disclosed in this patent document could optionally support the emulation of any suitable legacy protocol over an Internet Protocol (IP)-based network or other advanced network.

Figure 1:
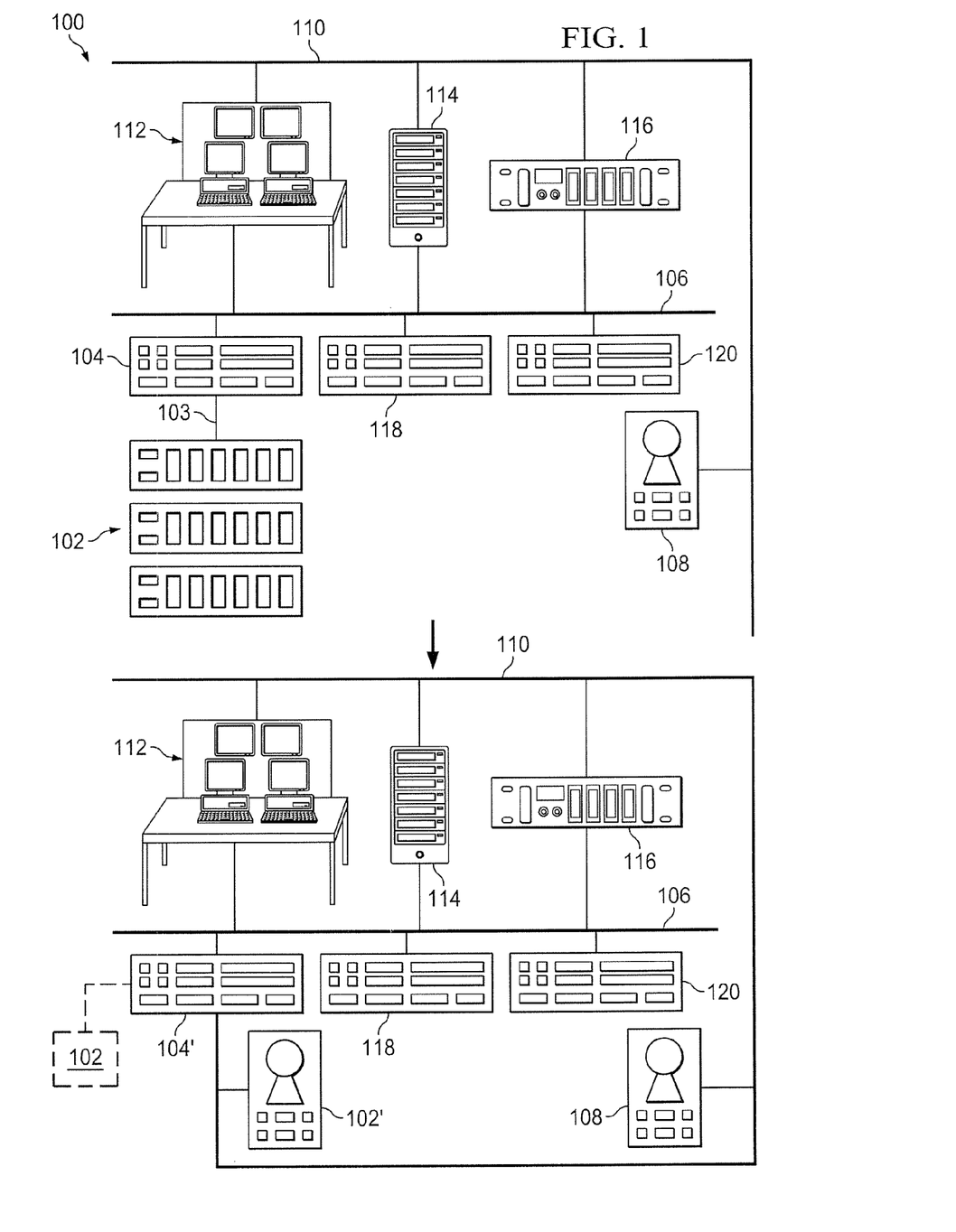
FIG. 1 illustrates an example migration from legacy devices to new devices in an industrial process control and automation system according to this disclosure.

FIG. 1 illustrates an example migration from legacy devices to new devices in an industrial process control and automation system 100 according to this disclosure. As shown in FIG. 1, the system 100 includes one or more legacy controllers 102, which are often said to reside within or form a part of a "Level 1" controller network in a control and automation system. Each legacy controller 102 is capable of controlling one or more characteristics in an industrial process system. A process system generally represents any system or portion thereof configured to process one or more products or other materials in some manner. For instance, the legacy controllers 102 could receive measurements from one or more sensors and use the measurements to control one or more actuators. Each legacy controller 102 represents a controller to be replaced in the system 100.

The legacy controllers 102 communicate via a legacy network 103 with at least one legacy gateway 104. The legacy network 103 represents one or more communication paths that support interactions with the legacy controllers 102 using a legacy protocol. In some embodiments, the legacy network 103 could represent a coaxial network, such as a HIWAY network. However, the legacy network 103 could represent any other suitable legacy industrial process control network.

The legacy controllers 102 communicate with higher-level devices and systems via the legacy gateway(s) 104. In this example, each legacy gateway 104 facilitates communication between the legacy network 103 and a supervisory network 106, such as a local control network (LCN). Each legacy gateway 104 includes any suitable structure facilitating communication with one or more legacy devices via a supervisory network. The supervisory network 106 represents a network facilitating communication among higher-level process control and automation devices and systems.

In particular embodiments, the legacy controllers 102 represent HIWAY controllers and PROCESS INTERFACE UNIT (PIU) devices, such as TDC2000 devices from HONEYWELL INTERNATIONAL INC. These types of devices routinely communicate over a "data hiway," which uses the HIWAY protocol supported by the legacy gateway 104. The legacy gateway 104 converts between that protocol and the protocol used by the supervisory network 106.

The system 100 also includes one or more advanced controllers 108 that communicate over an advanced control network 110. The advanced controllers 108 represent controllers that are newer, more technologically advanced, or more feature-rich that the legacy controllers 102. Similarly, the control network 110 could represent a newer, more technologically advanced, or more feature-rich network for transporting control information, such as an IP-based network. In particular embodiments, the advanced controllers 108 could represent C300 controllers from HONEYWELL INTERNATIONAL INC., and the control network 110 could represent an FTE or other redundant IP-based network.

Various other components in the system 100 support a wide range of process control and automation-related functions. For example, one or more operator consoles 112 can be used by operators to interact with the system 100. At least one supervisory controller 114 and at least one server 116 provide higher-level control in the system 100. For instance, the supervisory controller 114 and/or server 116 could perform more advanced planning or scheduling operations, execute higher-level control strategies, or perform other functions. At least one application processing platform 118 can be used to automate various procedures in the system 100. At least one historian 120 can be used to collect and store data associated with operation of the system 100 over time. Various ones of these components are often said to reside within or form a part of a "Level 2" supervisory network in a control and automation system.

Each operator console 112 includes any suitable structure for facilitating operator interactions, such as an EXPERION STATION TPS from HONEYWELL INTERNATIONAL INC. Each controller 114 includes any suitable structure for providing supervisory control, such as an APPLICATION CONTROL ENVIRONMENT-TPS (ACE-T) node from HONEYWELL INTERNATIONAL INC. Each server 116 represents any suitable computing device, such as an EXPERION SERVER TPS from HONEYWELL INTERNATIONAL INC. (or a redundant pair of such servers). Each application processing platform 118 includes any suitable structure for executing automated procedures, such as an APPLICATION MODULE (AM) from HONEYWELL INTERNATIONAL INC. Each historian 120 includes any suitable structure for storing data, such as a HISTORY MODULE (HM) from HONEYWELL INTERNATIONAL INC.

As shown in FIG. 1, the legacy controllers 102 are being replaced with advanced controllers 102'. This could occur, for instance, when the legacy controllers 102 have reached their "end of life" and are no longer supported by a vendor or manufacturer. Moreover, the legacy gateway 104 is being replaced with a junction gateway 104', which (as described below) supports the migration from the legacy controllers 102 to the advanced controllers 102'.

One conventional approach to replacing legacy controllers is "rip and replace," where a facility or portion thereof is simply shut down and the legacy controllers are replaced with new controllers. However, this approach requires facility down time and associated monetary losses. Moreover, legacy controllers 102 are often managed using higher-level components, such as the application processing platform 118 that typically implements a large number of procedures involving the legacy controllers 102. As a result, simply replacing the legacy controllers 102 would require large amounts of work to update the procedures executed by the application processing platform 118 or to migrate those procedures to a supervisory controller 114. In addition, operators often interact with legacy controllers 102 via interfaces provided at the operator consoles 112. The "rip and replace" technique typically requires updating or replacing the interfaces supported by the operator consoles 112 and may actually require replacement of the entire supervisory network 106 and all connected devices.

In accordance with this disclosure, the junction gateway 104' supports an improved transition between the use of legacy controllers 102 and the use of advanced controllers 102'. As described in more detail below, the junction gateway 104' can be connected to both the legacy controllers 102 (via the legacy network 103) and the advanced controllers 102' (via the control network 110). This allows the legacy controllers 102 to remain online and operational while the advanced controllers 102' are installed, commissioned, and brought online. Once the advanced controllers 102' are ready for operation, control of a process system can be transferred from the legacy controllers 102 to the advanced controllers 102'. This helps to avoid shutting down part or all of a process system and allows operators to verify that the advanced controllers 102' are operating correctly prior to placing them into active control operation.

The junction gateway 104' may also emulate or otherwise support at least one legacy protocol over the control network 110. For example, the junction gateway 104' could be configured to emulate the HIWAY protocol used by legacy controllers 102 over an FTE or other advanced control network 110. This allows some higher-level devices (such as the components 118-120) to interact with the advanced controllers 102' via the gateway 104' as if the advanced controllers 102' support the legacy protocol(s) used by the legacy controllers 102. This also allows other higher-level devices (such as the components 112-116) to interact with the advanced controllers 102' via the network 110 without using the gateway 104'. As a particular example, the junction gateway 104' can receive requests from higher-level devices, scatter the requests to the advanced controllers 102', gather responses that are in a format compliant with a legacy protocol, and submit compiled responses to the higher-level devices.

Using these techniques, the junction gateway 104' allows legacy controllers 102 to be replaced with advanced controllers 102' without requiring a shutdown of part or all of an industrial process system. Moreover, the junction gateway 104' allows the advanced controllers 102' to be installed, commissioned, and tested without interfering with the control operations of the legacy controllers 102, allowing the advanced controllers 102' to be brought online without interrupting the control of the process system. Further, the junction gateway 104' could allow the advanced controllers 102' to be used with both higher-level components that still use the legacy protocol and higher-level components that use an advanced protocol. This could reduce or avoid the need to update or migrate procedures executed by the application processing platform 118 and the interfaces supported by the operator consoles 112.

In addition, using these techniques, it is possible to "decouple" the replacement of the legacy controllers 102 from the replacement of components such as Level 2 devices or systems. As a result, the Level 2 devices or systems can be replaced at the same time as or at a different time than the legacy controllers 102. For example, most or all Level 2 devices or systems can continue operations with the advanced controllers 102' and can be replaced as fast or as slow as desired. This can help to reduce the cost of replacing the legacy controllers 102 and allow expenses to be distributed over a greater length of time.

Example details regarding the junction gateway 104' are provided below. Note that the system 100 could include any number of junction gateways 104' to support the migration of any number of legacy controllers 102 or other legacy devices to advanced controllers 102' or other advanced devices.

Although FIG. 1 illustrates one example of a migration from legacy devices to new devices in an industrial process control and automation system 100, various changes may be made to FIG. 1. For example, various components in FIG. 1 could be combined, further subdivided, moved, or omitted and additional components could be added according to particular needs. Also, the system 100 could include any number of each component shown in FIG. 1. Control and automation systems come in a wide variety of configurations, and FIG. 1 does not limit the scope of this disclosure to any particular configuration. In addition, the components 112-120 shown in FIG. 1 are only examples of the types of higher-level components that might be present in a system and interact with legacy controllers 102 and advanced controllers 102'. Other or additional higher-level components could also be used.

Figure 2:
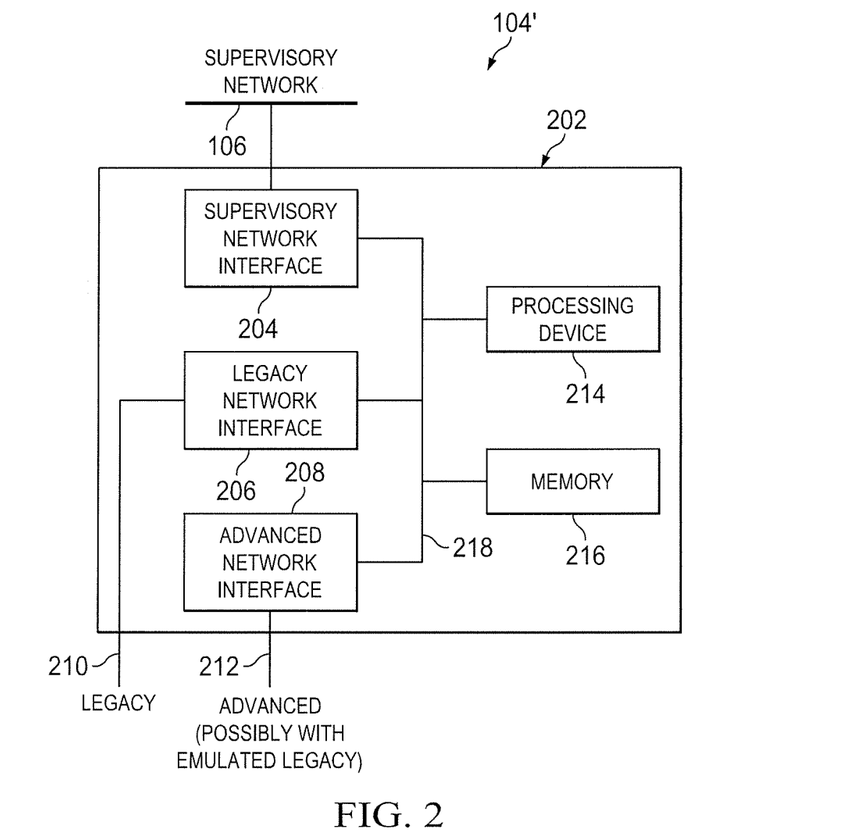
FIGS. 2 through 4 illustrate an example gateway supporting migration from legacy devices to new devices and related details according to this disclosure.
Figure 3:
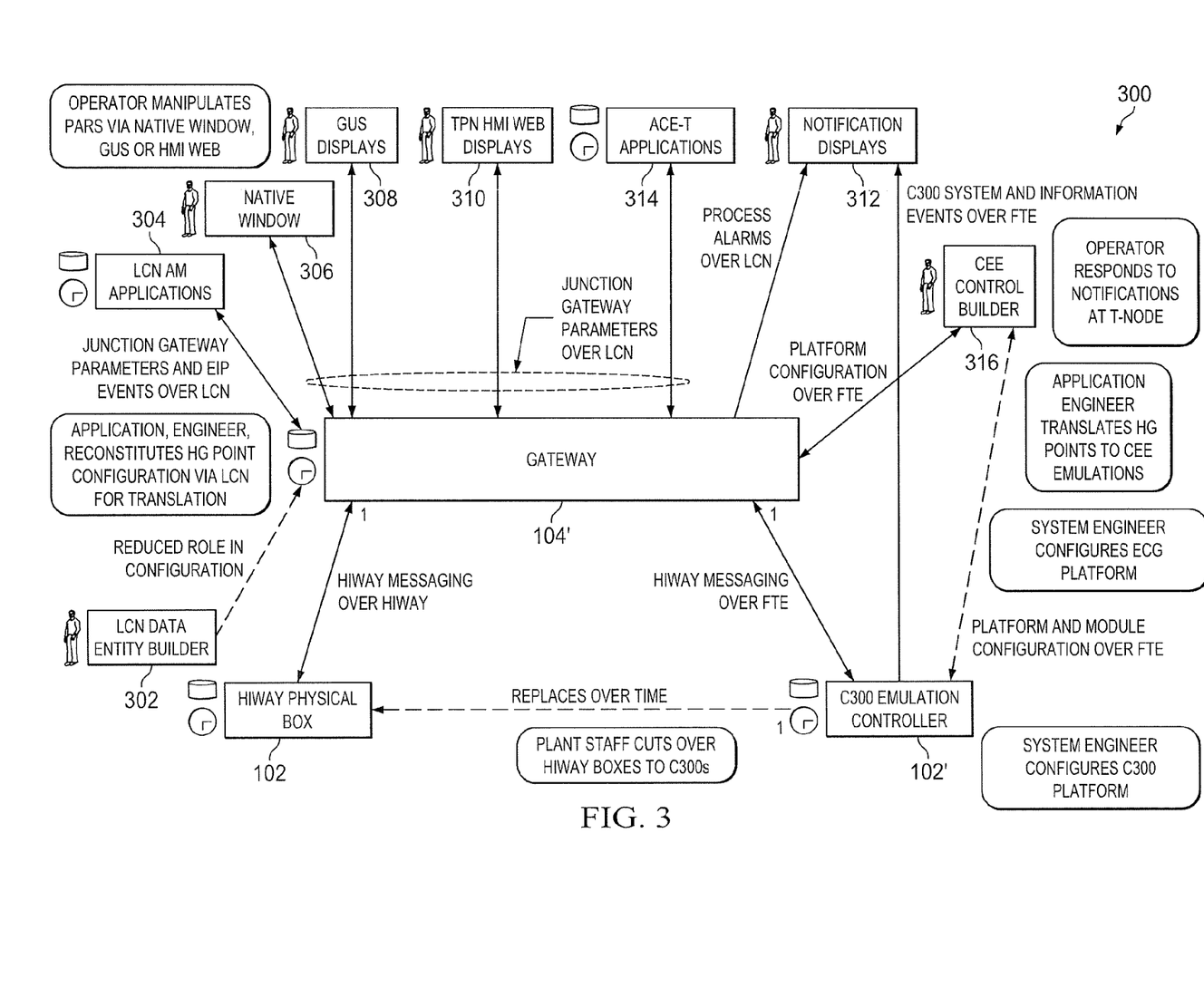
Figure 4:
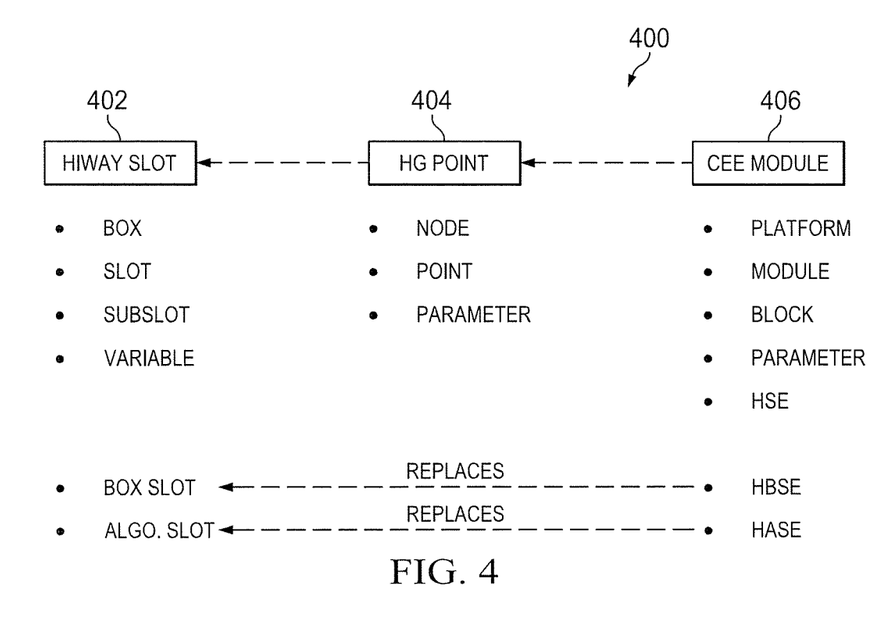

FIGS. 2 through 4 illustrate an example gateway 104' supporting migration from legacy devices to new devices and related details according to this disclosure. For ease of explanation, the gateway 104' in FIGS. 2 through 4 is described as being used in the system 100 of FIG. 1. The gateway 104' could be used in any other suitable system to support migration from any suitable legacy devices to any suitable advanced devices.

As shown in FIG. 2, the gateway 104' includes a housing 202. The housing 202 generally denotes a structure that protects, encases, or holds other components of the gateway 104'. The housing 202 includes any suitable structure in which other components of a gateway can be placed. The housing 202 could also be formed from any suitable material(s) and in any suitable manner. In particular embodiments, the housing 202 includes a chassis into which printed circuit board (PCB) cards can be inserted and coupled to a backplane or other structure.

The gateway 104' also includes three interfaces 204-208. The interface 204 supports communication over a supervisory network 106. For example, the interface 204 can receive data from and transmit data to various components 112-120 coupled to the supervisory network 106 using at least one standard or proprietary protocol.

The interface 206 supports communication over a legacy communication link 210, which could be coupled to the legacy network 103. The legacy communication link 210 represents a communication link used to communicate with one or more legacy controllers 102. In particular embodiments, the legacy communication link 210 supports communication with HIWAY controllers and PIU devices.

The interface 208 supports communication over an advanced communication link 212. The communication link 212 could represent a communication link used to communicate over the advanced control network 110, and those communications can optionally be made via an emulation of the legacy protocol used by legacy controllers 102 (although this is not necessarily required). In particular embodiments, the communication link 212 supports communication using an emulated HIWAY protocol over an FTE or other IP-based network.

Among other things, the gateway 104' can translate between the protocols used by the supervisory network 106, the control network 110, and the legacy network 103. This allows the legacy controllers 102 to be used while the advanced controllers 102' are being installed, commissioned, and brought online. This can optionally allow communications to and from the advanced controllers 102' using the emulated protocol, so higher-level devices that still use or rely on the legacy protocol can continue to interact with the advanced controllers 102'.

The gateway 104' also includes at least one processing device 214 and at least one memory 216. The processing device 214 controls the overall operation of the gateway 104'. For example, the processing device 214 could control the operations of the interfaces 204-208 to thereby control the transmission and reception of data by the gateway 104'. The processing device 214 could also support any translations or other operations needed to support the flow of data between different interfaces 204-208. For instance, the processing device 214 can determine how specific controllers are to be contacted and initiate communications to and from the controllers via the appropriate interfaces 206-208. As a particular example, the processing device 214 can support the "scattering/gathering" of requests and responses, meaning the processing device 214 can transmit (scatter) requests to one or multiple devices (legacy and/or advanced devices), collect (gather) responses to the requests, and combine the responses into a suitable format for transmission over the supervisory network 106.

The processing device 214 includes any suitable structure for performing or controlling operations of a gateway, such as one or more processing or computing devices. As particular examples, the processing device 214 could include at least one microprocessor, microcontroller, digital signal processor, field programmable gate array, application specific integrated circuit, or discrete logic device.

The memory 216 stores instructions or data used, generated, or collected by the gateway 104'. For example, the memory 216 could store software or firmware instructions executed by the processing device 214. The memory 216 could also store data received via one interface 204-208 that is to be transmitted over another interface 204-208. The memory 216 includes any suitable volatile and/or non-volatile storage and retrieval device(s), such as at least one random access memory and at least one Flash or other read-only memory.

In particular embodiments, the interface 204 could represent a K4LCN interface card from HONEYWELL INTERNATIONAL INC., with modifications made to the firmware of the card to support appropriate interactions over the supervisory network 106. The processing device 214 and the memory 216 could reside on the K4LCN interface card. Also, in particular embodiments, the interface 206 could represent a DATA HIGHWAY INTERFACE (DHI) card from HONEYWELL INTERNATIONAL INC. Further, in particular embodiments, the interface 208 could represent an interface card with firmware designed to emulate the HIWAY protocol over an FTE or other IP-based network, which could be known as an ENHANCED HIWAY BRIDGE INTERFACE (EHBI).

A bus 218 supports communications between other components of the gateway 104', such as the interfaces 204-208, the processing device 214, and the memory 216. The bus 218 represents any suitable communication path(s) for transporting data or other signals in a gateway.

By providing both the interfaces 206-208, the gateway 104' is able to support communications over both a legacy network 103 and an advanced control network 110. Moreover, by using the single interface 204, the gateway 104' is able to present itself as a single logical HIWAY device (or a device compliant with another legacy protocol) on the supervisory network 106. Thus, the gateway 104' enables communications with both legacy controllers 102 and advanced controllers 102' while still appearing as an appropriate device on the supervisory network 106 to higher-level components.

FIG. 3 illustrates one example usage of the gateway 104'. In FIG. 3, rectangles are used to denote subsystems of a control and automation system 100. Solid lines indicate data/information flows between subsystems, and dashed lines indicate logical relationships between subsystems. Ovals represent example use cases, meaning example ways in which the gateway 104' could be used. In this particular example, the legacy devices being replaced represent HIWAY devices, the advanced devices represent C300 controllers, and the network 110 represents an FTE network. This is for illustration only, and other type(s) of controllers and networks could be used.

In FIG. 3, an LCN data entity builder (DEB) 302 represents an application used to configure and manage legacy controllers 102, such as to perform engineering configurations on the legacy controllers. Components 304-314 represent subsystems of the system 100 that can interact with the gateway 104' over the supervisory network 106. Applications 304 denote applications that could be executed on an APPLICATION MODULE or other application processing platform 118. Native windows 306, global user station (GUS) displays 308, HMIWEB displays 310, and notification displays 312 represent applications that present displays to operators via different types of operator consoles 112. The displays 306-310 can be used by operators to make changes to certain variables associated with a process system, and the display 312 can be used by operators to acknowledge or respond to various notifications. Applications 314 denote applications that could be executed on an ACE-T node or other supervisory controller 114.

A control builder 316 can be used to configure and manage the advanced controllers 102'. The control builder 316 can be used, for example, by one or more applications engineers to translate HIWAY GATEWAY (HG) control points into suitable control execution environment (CEE) emulations. The control builder 316 can also be used by one or more systems engineers to configure the interface 208 in the gateway 104' and the advanced controllers 102'.

As shown in FIG. 3, different types of information can be exchanged between the components of FIG. 3 over different types of networks. For example, the gateway 104' can exchange HIWAY messages with the legacy controllers 102 over the legacy network 103. The gateway 104' can also exchange emulated HIWAY messages with the advanced controllers 102' over the network 110. The gateway 104' can further exchange gateway parameters, as well as event initiated processing (EIP) events, with the components 304-312 over the supervisory network 106. In addition, the gateway 104' can exchange process alarms with the notification displays 312 and configuration data with the control builder 316 over the control network 110. Moreover, the advanced controllers 102' can communicate events to the notification displays 312 and exchange configuration data with the control builder 316 over the control network 110.

As described above, one use of the gateway 104' is to facilitate migration from the legacy controllers 102 to the advanced controllers 102' without requiring a shutdown of part or all of an industrial process system. This can be accomplished using, among other things, concurrent access via the gateway 104' to the legacy controllers 102 and the advanced controllers 102'. Moreover, the decoupling of the migration of Level 1 and Level 2 devices can be supported using, among other things, the emulation of a legacy protocol (such as a HIWAY protocol) by the gateway 104' so that higher-level devices can continue operating under the assumption that the advanced controllers 102' support the legacy protocol. As a result, Level 1 legacy devices (such as legacy controllers 102) can be migrated to advanced devices (such as advanced controllers 102') without requiring much if any modifications to Level 2 components. The Level 2 components could be migrated at the same time as the Level 1 components, or any desired length(s) of time could elapse until the Level 2 components are migrated.

Moreover, the concurrent access to the legacy controllers 102 and the advanced controllers 102' supports both fast and prolonged cutovers of the controllers. The use of the gateway 104' allows the legacy controllers 102 to be used to control a process system while the advanced controllers 102' are installed, commissioned, and tested. This can occur over a short period of time or a prolonged period of time depending on various factors. Once operation of the advanced controllers 102' is determined to be satisfactory, the advanced controllers 102' can be placed into control operation while the legacy controllers 102 are placed into standby mode. If the advanced controllers 102' perform as expected, the legacy controllers 102 can be decommissioned and removed from the system. If the advanced controllers 102' do not perform as expected, the legacy controllers 102 can be brought back into active operation.

In addition, it is possible for the migration of legacy controllers 102 to advanced controllers 102' to occur incrementally, such as one legacy controller 102 or a subset of legacy controllers 102 at a time. Thus, there may be times when both legacy controllers 102 and advanced controllers 102' are performing control actions in the system 100. The gateway 104' supports such incremental migration by helping to ensure that communications with both types of controllers can occur concurrently.

In this particular embodiment, the gateway 104' supports the use of an emulated HIWAY protocol over an FTE control network 110. This can be done, for example, to communicate with the C300 advanced controllers 102' via the control network 110. In this approach, the gateway 104' emulates the use of the HIWAY protocol, but data is transported over the network 110 using IP-based data packets.

As noted above, the gateway 104' supports the "scattering" of requests and the "gathering" of responses. For example, the processing device 214 could receive a request via the interface 204 and identify the controller(s) to receive the request. The processing device 214 could then "scatter" the request to one or more controllers via one or more of the interfaces 206-208. The exact interface(s) 206-208 used could depend on which controller(s) need to receive the request and what the "box network state" is of the controller(s) to receive the request. In some embodiments, the box network state could indicate that a controller is either a HIWAY device (for a legacy controller) or an ETHERNET device (for an advanced controller). If sent over the legacy network 103, the request could follow the standard legacy protocol. If sent over the control network 110, the processing device 214 can optionally emulate the legacy protocol using IP-based messages. In either case, the appropriate controller(s) 102, 102' can receive the request and respond, such as via a standard HIWAY response or via an IP-based response containing the contents of a standard HIWAY response. The processing device 214 can then "gather" the one or more responses from the appropriate controller(s) and place the responses into a suitable format for communication over the supervisory network 106.

FIG. 4 illustrates example details related to emulating or otherwise supporting a legacy protocol. In particular, FIG. 4 illustrates example control protocols 402-406 used by different devices. The first protocol 402 is used by HIWAY devices (such as legacy controllers 102). A "box" refers to a particular device, a "slot" defines a particular memory location, a "subslot" can define a particular part of a slot, and a "variable" defines the value stored in the slot. A "box slot" refers to the logical grouping of all data resident within a legacy controller that describes box-wide properties rather than algorithm specific properties, and an "algorithm slot" refers to a particular algorithm that can be executed by a legacy controller.

The second protocol 404 is used by various supervisory devices. A "node" refers to a particular device, and a "point" and a "parameter" (often referred to as "point.parameter") refer to a particular value in the identified device. The third protocol 406 is used by EXPERION devices. A "platform" refers to a particular device, and a "module," a "block," and a "parameter" refer to a particular value in the identified device.

Advanced controllers 102' or gateways 104' support the use of these various protocols 402-406. For example, the protocol 402 can be used to communicate with legacy controllers 102, the protocol 404 can be used to communicate with higher-level components such as the components 118-120, and the protocol 406 can be used to communicate with higher-level components such as the components 112-116.

Note that there are a wide variety of ways in which these protocols can be used. For example, in a first approach, emulations of HIWAY algorithms or other legacy algorithms can be created in an advanced controller 110 that present data and messaging consistent with original HIWAY or other legacy objects. In a second approach, HIWAY or other legacy algorithms can be ported to an advanced controller 110, and the re-hosted algorithms can present their original data and messages just as they did on the legacy network. In a third approach, translation functionality can be supported by a junction gateway 104' so that the gateway 104' can receive data and messages native to the advanced controller 110 and present the data and messages in a format expected on the supervisory network 106. In a fourth approach, a junction gateway 104' is used over a controller whose migration includes changing its network interface from the legacy network to the advanced network without changing the controller or its algorithms at all. In this fourth approach, an application protocol used by the legacy controller is unchanged and can be wrapped by the protocol used in the advanced network.

Although FIGS. 2 through 4 illustrate one example of a gateway 104' supporting migration from legacy devices to new devices and related details, various changes may be made to FIGS. 2 through 4. For example, the functional division shown in FIG. 2 is for illustration only. Various components in FIG. 2 could be combined, further subdivided, moved, or omitted and additional components could be added according to particular needs. As a particular example, the processing device 214 and memory 216 could be placed onto the same PCB card or other substrate as one, some, or all interfaces 204-208. Also, the specific protocols and use cases shown in FIGS. 3 and 4 are examples only. The gateway 104' could support the use of other or additional protocols, and the gateway 104' could be used in any other suitable manner.

Figure 5:
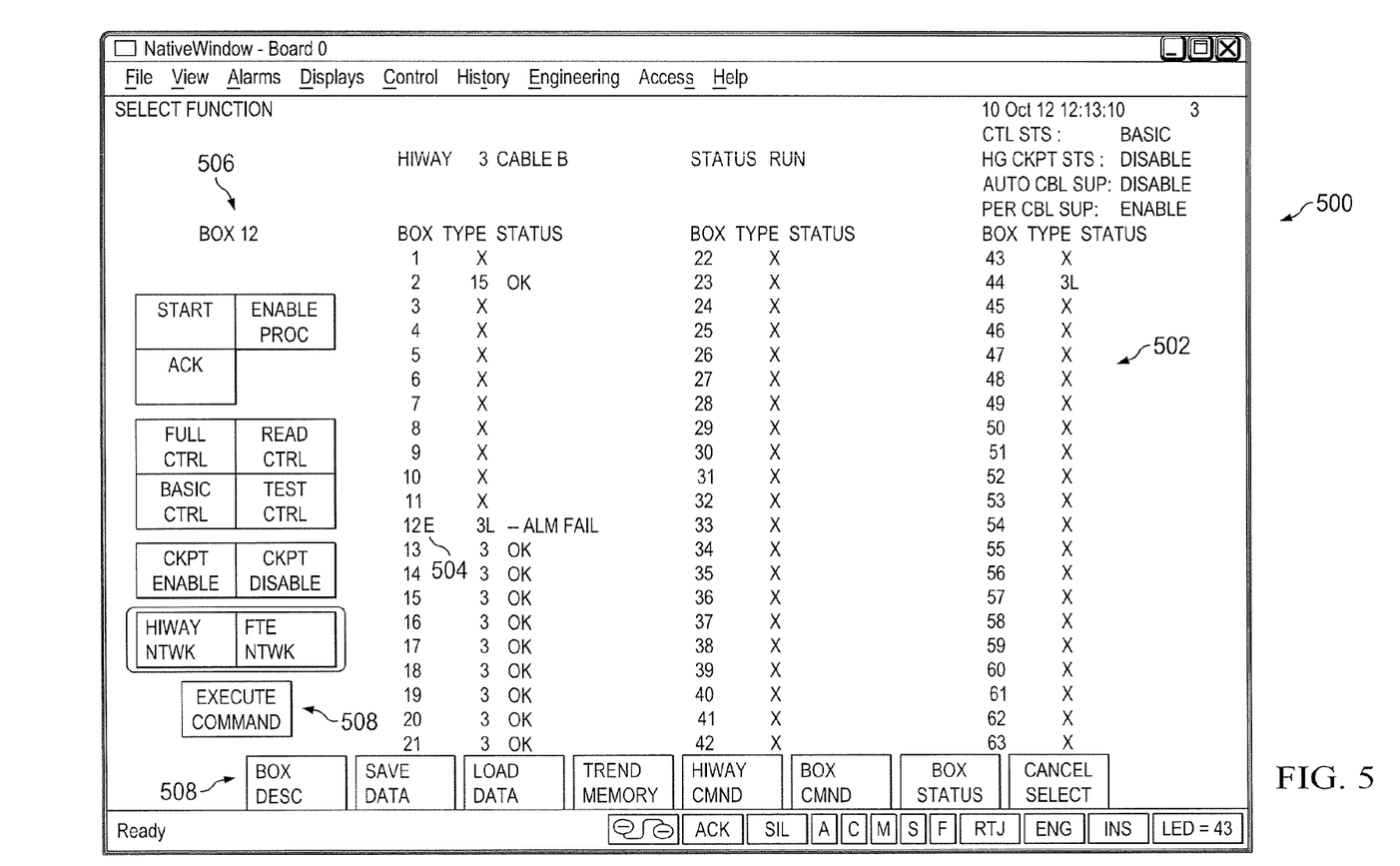

FIGS. 5 and 6 illustrate example graphical user interfaces supporting migration from legacy devices to new devices according to this disclosure. In FIG. 5, a graphical user interface 500 presents a list 502 of "boxes" coupled to a gateway 104'. The boxes here can include legacy devices, advanced devices, or a combination thereof. For each device identified in the list 502, the interface 500 identifies the number, type, and status of that device. The interface 500 also uses an identifier 504 to distinguish between legacy devices and advanced devices. The identifier 504 can be used to represent the box network state described above. The identifier 504 here represents the letter "E", which could indicate that a device is coupled to an "E"thernet network or uses an "E"mulated interface. However, any other suitable identifier could be used to distinguish legacy and advanced devices. Also, mechanisms other than textual identifiers could be used to distinguish legacy and advanced devices, such as color codings.

In FIG. 5, an operator has elected to show command options for the box numbered "12," which causes the gateway 104' to present a list 506 of commands in the interface. Controls 508 in the interface 500 can be used in various ways in the interface 500. In this case, the controls 508 can be used to invoke particular commands from the list 506 and to control the display of information in the interface 500.

In FIG. 6, a graphical user interface 600 can be used during replacement of a legacy controller 102 with an advanced controller 102'. As shown in FIG. 6, the interface 600 includes a listing 602 of control points associated with the legacy controller 102. Each control point is associated with a process variable and various values associated with the process variable. The interface 600 also includes a listing 604 of emulated control points associated with the advanced controller 102'.

The interface 600 can be presented to an operator during the time that wires and other data connections are being moved from the legacy controller 102 to the advanced controller 102'. As can be seen in FIG. 6, the values in the listing 604 are identical or substantially identical to the values in the listing 602. This indicates that the advanced controller 102' is receiving the same data and operating to produce substantially the same outputs that the legacy controller 102 being replaced was receiving and producing.

Although FIGS. 5 and 6 illustrate examples of graphical user interfaces supporting migration from legacy devices to new devices, various changes may be made to FIGS. 5 and 6. For example, these interfaces are merely meant to illustrate different types of interfaces that could be supported by a gateway 104'. Any other or additional interfaces could also be used.

FIGS. 7 through 10 illustrate example methods for supporting migration from legacy devices to new devices according to this disclosure. For ease of explanation, the methods in FIGS. 7 through 10 are described as being used with the gateway 104' in the system 100 of FIG. 1. However, the methods could be used by any suitable gateway and in any suitable system.

Figure 7:
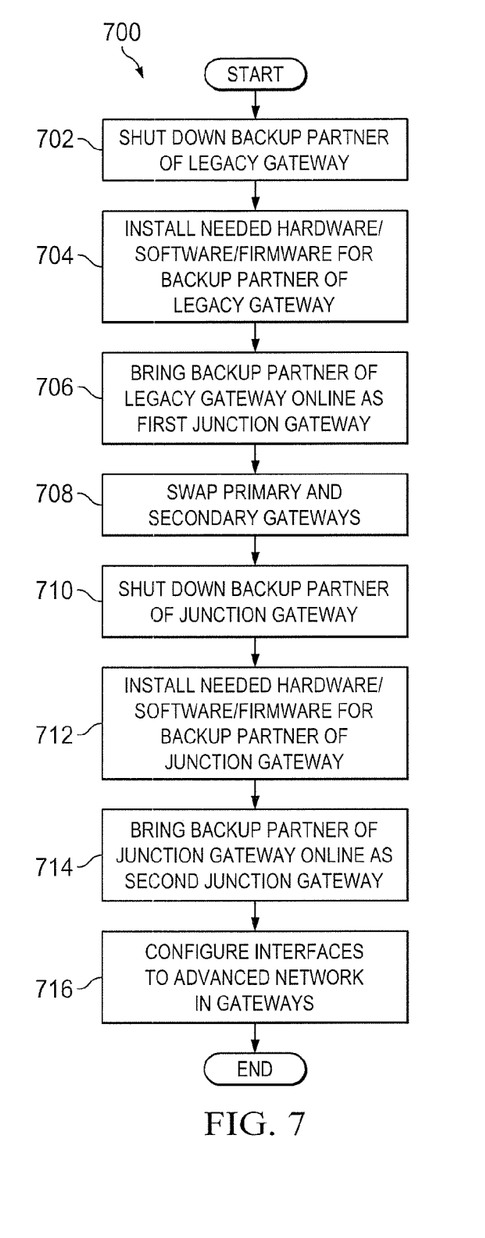
FIGS. 7 through 10 illustrate example methods for supporting migration from legacy devices to new devices according to this disclosure.

FIG. 7 illustrates an example method 700 for migrating a legacy gateway 104 to a junction gateway 104'. This migration could occur so that a junction gateway 104' is available in the system 100 prior to migrating from the legacy controllers 102 to the advanced controllers 102'. In the following discussion, it is assumed that the legacy gateway 104 includes PCB cards that support the interface 204 to the supervisory network 106 and an interface 206 to the legacy network 103. It is also assumed that legacy gateways 104 operate in redundant pairs, where one legacy gateway 104 operates as a primary gateway and another legacy gateway 104 operates as a backup or secondary gateway in case the primary gateway fails.

As shown in FIG. 7, the backup partner of a legacy gateway is shut down at step 702. This could include, for example, personnel powering down the secondary legacy gateway 104, while the primary legacy gateway 104 can continue operating. Needed hardware/software/firmware is installed on the backup partner of the legacy gateway at step 704. This could include, for example, personnel installing a PCB card that supports the interface 208, which allows communication over an advanced network. This could also optionally include personnel programming the interface 208 to support an emulated protocol over the advanced network. This could further include personnel updating the processing device 214 to perform the desired operations of the gateway 104'. Once this is completed, the backup partner of the legacy gateway is brought back online as a first junction gateway at step 706. This could include, for example, bringing the upgraded gateway online as a first junction gateway 104' that is operating in the secondary role.

The primary and secondary gateways swap roles at step 708. That is, a second legacy gateway 104 can begin operating in the secondary role, while the first junction gateway 104' can begin operating in the primary role. This could occur at any suitable time, such as after operation of the first junction gateway 104' is verified. At this point, the same general steps 710-714 can be used to convert the backup partner of the first junction gateway 104' into a second junction gateway 104'. At the end of step 714, there are two junction gateways 104' operating in the system 100, one in a primary mode and one in a secondary mode. Interfaces to an advanced network in the gateways are configured at step 716. This could include, for example, personnel configuring EXPERION platform modules in the interfaces 208 of the junction gateways 104'.

During these steps, there may be a continuous communication path from the supervisory network 106 through at least one gateway 104, 104' to the legacy controllers 102. As a result, there may be no loss of communication or control during the migration from the legacy gateways 104 to the junction gateways 104'. Once the junction gateways 104' are available in the system 100 (however obtained), the replacement of legacy devices with advanced devices can occur as described below. Note that any length of time could elapse between (i) migration of the legacy gateways 104 to the junction gateways 104' and (ii) migration of the legacy controllers 102 to the advanced controllers 102'. Also note that migration of the legacy devices to the advanced devices could occur using a single junction gateway 104'.

Figure 8:
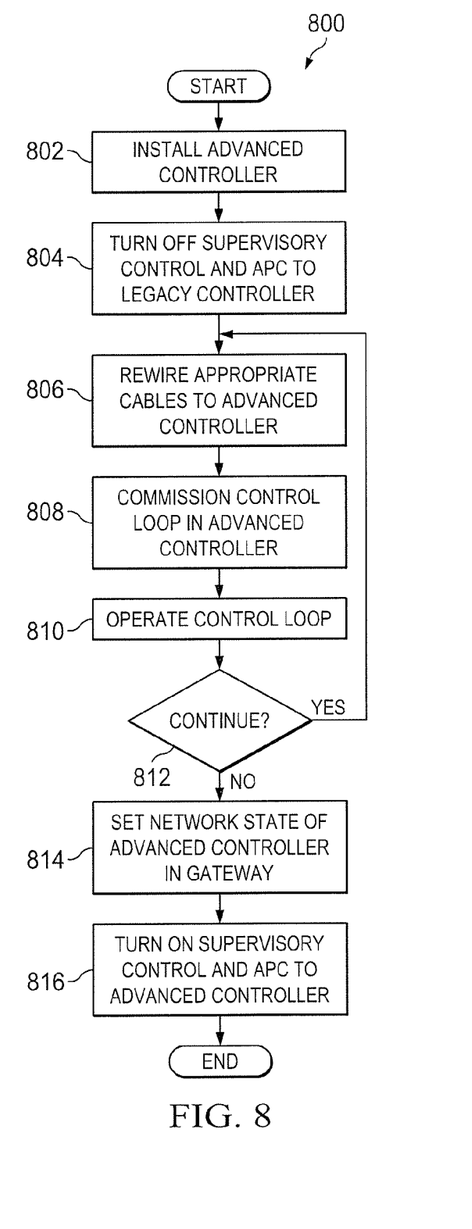

FIG. 8 illustrates an example method 800 for performing a cutover from a legacy controller 102 to an advanced controller 102'. In particular, the method 800 can be used to perform a cutover from a legacy controller 102 to an advanced controller 102' without requiring a shutdown of part or all of a process system.

As shown in FIG. 8, an advanced controller is installed in a facility at step 802. Supervisory control and advanced process control (APC) functionality used in conjunction with a legacy controller is deactivated at step 804. This could include, for example, personnel deactivating these functions in higher-level components of a control and automation system 100, such as in one or more Level 2 components.

Appropriate cables are rewired to the advanced controller at step 806, and a control loop is commissioned in the advanced controller at step 808. This could include, for example, personnel decoupling wires or other communication paths previously used to communicate with industrial field devices from the legacy controller 102 and coupling the wires or other communication paths to the advanced controller 102'. The cables rewired here could represent the cables needed for the current control loop. This could also include personnel creating an appropriate control loop in the advanced controller 102' for controlling one or more aspects of the industrial process system previously controlled by the legacy controller 102. As part of this, personnel could set certain control modes or HG points to manual mode. In some embodiments, this could further include personnel loading emulation logic into the advanced controller 102' if the advanced controller 102' is emulating a legacy protocol. As noted above, however, protocol emulation could be supported by the junction gateway 104' or in other ways. Once the advanced controller's output is balanced with the process, the current control loop can be placed into operation at step 810.

A decision is made whether to continue loading control loops at step 812. If so, the process returns to step 806. If not, the network state of the advanced controller is set to a suitable value in a junction gateway at step 814. This could include, for example, an application engineer changing the box network state previously associated with the legacy controller 102 to a new value associated with the advanced controller 102'. Supervisory control and APC functionality used in conjunction with the advanced controller are re-activated at step 816.

Note that during the cutover from the legacy controller 102 to the advanced controller 102', an interface such as that shown in FIG. 6 could be presented to an operator. This interface 600 allows the operator to see if the advanced controller 102' is receiving the same data and operating to produce substantially the same outputs that the legacy controller 102 being replaced was receiving and producing. Also note that while FIG. 8 assumes the legacy controller 102 is disconnected from the field devices when cables are rewired to the advanced controller 102', this need not be the case. For instance, the advanced controller 102' could be wired in parallel to the field devices with the legacy controller 102. The advanced controller 102' could be configured to receive data from certain field devices and identify desired control signals for other field devices, but the advanced controller 102' could be disabled from outputting those control signals until operation of the advanced controller 102' is approved. At that point, the legacy controller 102 can be disabled from outputting control signals while the advanced controller 102' is outputting control signals.

Figure 9:
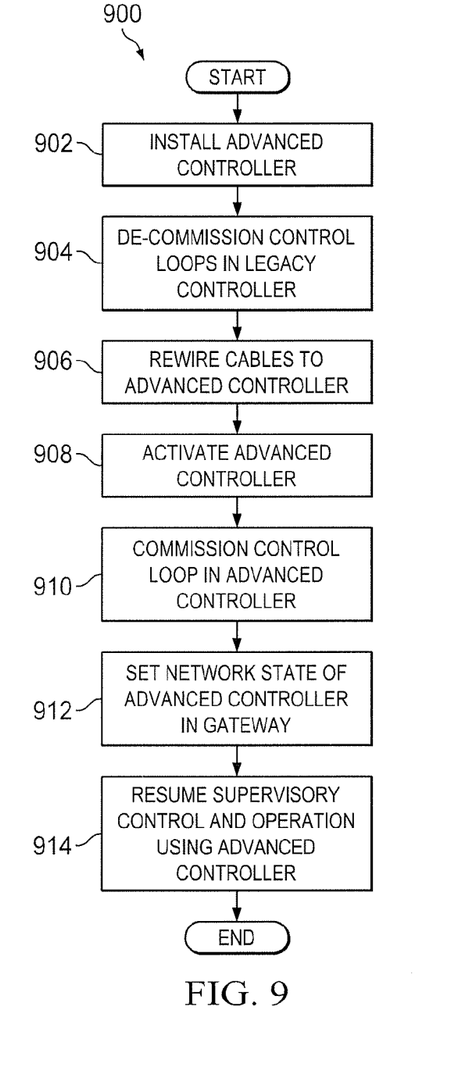

FIG. 9 illustrates another example method 900 for performing a cutover from a legacy controller 102 to an advanced controller 102'. In particular, the method 900 can be used to perform a cutover from a legacy controller 102 to an advanced controller 102' during a shutdown of part or all of a process system.

As shown in FIG. 9, an advanced controller is installed in a facility at step 902. One or more control loops in a legacy controller are de-commissioned at step 904. This could include, for example, personnel removing control loops from and deactivating a legacy controller 102. There is no need in this case to maintain control of part or all of the process system, so the legacy controller 102 can be removed from operation before the advanced controller 102' is brought online.

Appropriate cables are rewired to the advanced controller at step 906, the advanced controller is activated at step 908, and one or more control loops are commissioned in the advanced controller at step 910. This could include, for example, personnel decoupling wires or other communication paths previously used to communicate with industrial field devices from the legacy controller 102 and coupling the wires or other communication paths to the advanced controller 102'. This could also include personnel creating appropriate control loops in the advanced controller 102' for controlling all of the aspects of the industrial process system previously controlled by the legacy controller 102.

The network state of the advanced controller is set to a suitable value in a junction gateway at step 912. This could include, for example, an application engineer changing the box network state previously associated with the legacy controller 102 to a new value associated with the advanced controller 102'. Supervisory control and APC functionality used in conjunction with the advanced controller are resumed at step 914.

Note that in FIG. 9, a single legacy controller is being replaced during a partial or total shutdown of a process system. However, any number of legacy devices could be replaced during the shutdown. Moreover, there is no requirement that all legacy devices be replaced during the shutdown. For instance, a subset of the legacy devices could be replaced during the shutdown, and one or more junction gateways 104' can then be used to facilitate interactions with both legacy and advanced devices.

Figure 10:
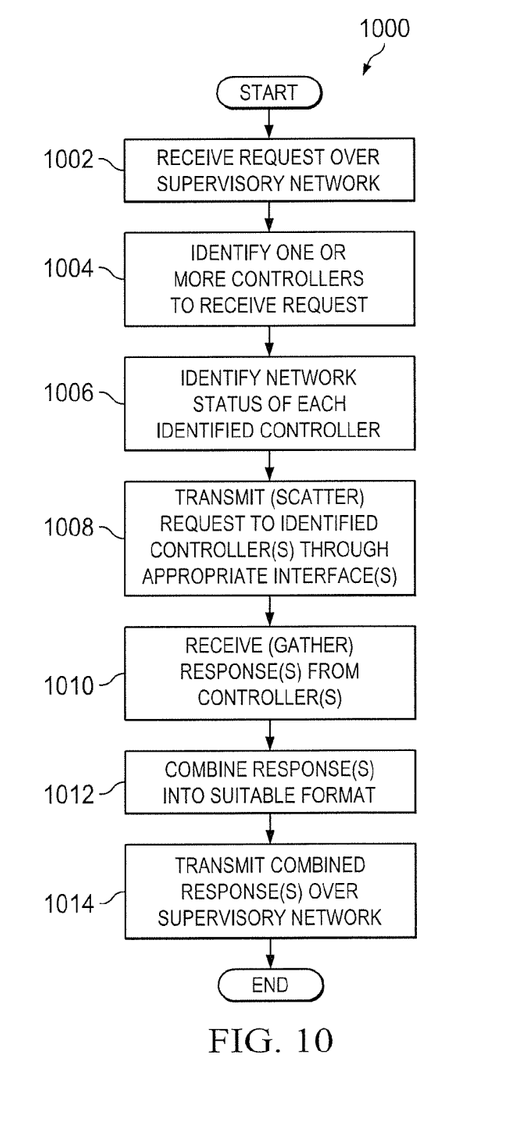

FIG. 10 illustrates an example method 1000 that can be performed by the gateway 104' to support interactions with legacy controllers 102 and/or advanced controllers 102' during device migration or at other times. As shown in FIG. 10, the gateway 104' receives a request over a supervisory network at step 1002. This could include, for example, the processing device 214 receiving a request from a higher-level device via the supervisory network 106 and the interface 204.

One or more controllers to receive the request are identified at step 1004. This could include, for example, the processing device 214 using the contents of the received request to identify which controller or controllers 102, 102' are to receive the request. The network status of each identified controller is identified at step 1006. This could include, for example, the processing device 214 using the box network status of each identified controller to determine whether that identified controller is configured to communicate over a legacy network or an advanced control network. The request is transmitted (scattered) to the identified controller(s) at step 1008. This could include, for example, the processing device 214 initiating transmission of the request to any identified legacy controllers 102 via the interface 206 and transmission of the request to any identified advanced controllers 102' via the interface 208.

One or more responses to the request are received from the identified controller(s) at step 1010. This could include, for example, the processing device 214 receiving a response from any identified legacy controllers 102 via the interface 206 and receiving a response from any identified advanced controllers 102' via the interface 208. The responses can be in a format compliant with a legacy protocol. The gateway combines the response(s) into a suitable format (if necessary) at step 1012 and transmits the combined response(s) over the supervisory network at step 1014. This could include, for example, the processing device 214 combining any responses into a format compliant with the HIWAY protocol.

In this way, the junction gateway 104' is able to effectively map multiple networks (the legacy network 103 and the advanced network 110) into the same logical representation expected by higher-level components. From the perspective of higher-level components, the gateway 104' could appear as a standard gateway that supports the legacy protocol without any knowledge that the gateway 104' also supports the use of an advanced protocol and is coupled to an advanced control network 110.

Although FIGS. 7 through 10 illustrate examples of methods for supporting migration from legacy devices to new devices, various changes may be made to FIGS. 7 through 10. For example, while each figure shows a series of steps, various steps in each figure could overlap, occur in parallel, occur in a different order, or occur any number of times. Moreover, the use of redundant gateways 104' is optional, as is the use of protocol emulation over an advanced control network.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
   a gateway including:
   a first interface configured to communicate over a first industrial process control network using a first protocol;
   a second interface configured to communicate over a second industrial process control network using a second protocol;
   a third interface configured to communicate with at least one supervisory device over a third network; and
   at least one processing device configured to provide concurrent access for the at least one supervisory device to process control devices coupled to the first and second industrial process control networks during a migration of process control devices that use the first protocol to process control devices that use the second protocol.

2. The apparatus of claim 1, wherein the second interface is configured to emulate the first protocol over the second industrial process control network.

3. The apparatus of claim 1, wherein the at least one processing device is further configured to make all of the process control devices coupled to the first and second industrial process control networks appear to be devices coupled only to the first industrial process control network.

4. The apparatus of claim 1, wherein the at least one processing device is further configured to provide substantially continuous access by the at least one supervisory device to at least one of the process control devices.

5. The apparatus of claim 4, wherein the at least one processing device is configured to provide the substantially continuous access by using a network state to identify whether requests from the at least one supervisory device are transmitted to a specified process control device via the first interface or via the second interface.

6. The apparatus of claim 5, wherein the at least one processing device is configured to track multiple network states as multiple process control devices coupled to the first industrial process control network are migrated to multiple process control devices coupled to the second industrial process control network.

7. The apparatus of claim 1, wherein:
   the first interface is configured to communicate over a coaxial network; and
   the second interface is configured to communicate over a redundant Ethernet network.

8. A method comprising:
   communicating over a first industrial process control network using a first protocol via a first interface of a gateway;
   communicating over a second industrial process control network using a second protocol via a second interface of the gateway;
   communicating with at least one supervisory device over a third network via a third interface of the gateway; and
   providing concurrent access, by the gateway, for the at least one supervisory device to process control devices coupled to the first and second industrial process control networks during a migration of process control devices that use the first protocol to process control devices that use the second protocol.

9. The method of claim 8, wherein the second interface emulates the first protocol over the second industrial process control network.

10. The method of claim 8, further comprising:
making all of the process control devices coupled to the first and second industrial process control networks appear to be devices coupled only to the first industrial process control network.

11. The method of claim 8, further comprising:
providing substantially continuous access by the at least one supervisory device to at least one of the process control devices.

12. The method of claim 11, wherein providing the substantially continuous access comprises using a network state to identify whether requests from the at least one supervisory device are transmitted to a specified process control device via the first interface or via the second interface.

13. The method of claim 12, further comprising:
tracking multiple network states as multiple process control devices coupled to the first industrial process control network are migrated to multiple process control devices coupled to the second industrial process control network.

14. The method of claim 13, wherein:
the process control devices coupled to the first industrial process control network comprise legacy process controllers controlling one or more aspects of an industrial process system; and
the process control devices coupled to the second industrial process control network comprise advanced process controllers controlling the one or more aspects of the industrial process system.

15. The method of claim 8, wherein:
the first and second industrial process control networks comprise Level 1 networks; and
the third network comprises a Level 2 network.

16. A non-transitory computer readable medium containing a computer program, the computer program comprising computer readable program code that when executed causes at least one processing device to:
initiate communication over a first industrial process control network using a first protocol via a first interface of a gateway;
initiate communication over a second industrial process control network using a second protocol via a second interface of the gateway;
initiate communication with at least one supervisory device over a third network via a third interface of the gateway; and
provide concurrent access, by the gateway, for the at least one supervisory device to process control devices coupled to the first and second industrial process control networks during a migration of process control devices that use the first protocol to process control devices that use the second protocol.

17. The non-transitory computer readable medium of claim 16, wherein the computer program further comprises computer readable program code that when executed causes the at least one processing device to make all of the process control devices coupled to the first and second industrial process control networks appear to be devices coupled only to the first industrial process control network.

18. The non-transitory computer readable medium of claim 16, wherein the computer program further comprises computer readable program code that when executed causes the at least one processing device to provide substantially continuous access by the at least one supervisory device to at least one of the process control devices.

19. The non-transitory computer readable medium of claim 18, wherein the computer readable program code that when executed causes the at least one processing device to provide the substantially continuous access comprises:
computer readable program code that when executed causes at least one processing device to use a network state to identify whether requests from the at least one supervisory device are transmitted to a specified process control device via the first interface or via the second interface.

20. The non-transitory computer readable medium of claim 19, wherein the computer program comprises computer readable program code that when executed causes the at least one processing device to track multiple network states as multiple process control devices coupled to the first industrial process control network are replaced with multiple process control devices coupled to the second industrial process control network.

* * * * *